(12) United States Patent
Uchida et al.

(10) Patent No.: US 7,472,987 B2
(45) Date of Patent: Jan. 6, 2009

(54) HEAD MODULE, PRINTING APPARATUS, AND PRINTING METHOD

(75) Inventors: Hiroto Uchida, Kanagawa (JP); Masao Murata, Kanagawa (JP); Yasuzo Tanaka, Kanagawa (JP); Junpei Yuyama, Kanagawa (JP); Hiroshi Koshina, Kanagawa (JP); Yuya Inoue, Kanagawa (JP); Takanori Tsuji, Kanagawa (JP); Koji Hane, Kanagawa (JP)

(73) Assignee: ULVAC, Inc., Chigasaki-shi (JP)

( * ) Notice: Subject to any disclaimer, the term of this patent is extended or adjusted under 35 U.S.C. 154(b) by 58 days.

(21) Appl. No.: 11/790,480

(22) Filed: Apr. 25, 2007

(65) Prior Publication Data

US 2007/0216739 A1 Sep. 20, 2007

Related U.S. Application Data

(63) Continuation of application No. PCT/JP05/19197, filed on Oct. 19, 2005.

(30) Foreign Application Priority Data

| Oct. 28, 2004 | (JP) | ............................. 2004-314498 |
| Oct. 28, 2004 | (JP) | ............................. 2004-314499 |

(51) Int. Cl.
  *B41J 2/175* (2006.01)
  *B41J 2/18* (2006.01)

(52) U.S. Cl. .............................. 347/85; 347/93; 347/89

(58) Field of Classification Search .................... 347/85, 347/89, 93, 44, 47, 54, 65, 66, 68, 84, 20–36
See application file for complete search history.

(56) References Cited

U.S. PATENT DOCUMENTS

| 6,224,201 B1* | 5/2001 | Shigemura .................... 347/93 |
| 6,231,174 B1* | 5/2001 | Haigo .......................... 347/89 |
| 6,398,351 B1* | 6/2002 | Blum et al. ................... 347/84 |
| 6,715,863 B2* | 4/2004 | Shimizu ....................... 347/85 |
| 7,380,927 B2* | 6/2008 | Shigemura .................... 347/89 |

FOREIGN PATENT DOCUMENTS

| JP | 4-501011 | 2/1992 |
| JP | 2002-268071 | 9/2002 |
| JP | 2003-121854 | 4/2003 |
| WO | WO 90/01721 A1 | 2/1990 |

* cited by examiner

*Primary Examiner*—Stephen D Meier
*Assistant Examiner*—Rene Garcia, Jr.
(74) *Attorney, Agent, or Firm*—Kratz, Quintos & Hanson, LLP

(57) ABSTRACT

According to a first invention, since a flow of a spacer dispersed liquid is formed in a transporting chamber separated from a discharging chamber by an internal filter, the spacer dispersed liquid is stably discharged through an ejection hole, while the discharging chamber on a side of a nozzle plate is not affected by the flow of the spacer dispersed liquid. According to a second invention, since a spacer dispersed liquid does not flow inside a discharging chamber in a printing state in which the spacer dispersed liquid is discharged, the spacer dispersed liquid is stably discharged through an ejection hole. To the contrary, since the spacer dispersed liquid is directed inside both the discharging chamber and the transporting chamber in a waiting state in which the spacer dispersed liquid is not discharged, spacer particles in the spacer dispersed liquid do not settle.

18 Claims, 4 Drawing Sheets

HEAD MODULE, PRINTING APPARATUS, AND PRINTING METHOD

This is a Continuation of International Application No. PCT/JP2005/019197 filed Oct. 19, 2005. The entire disclosure of the prior application is hereby incorporated by reference herein in its entirety.

BACKGROUND OF THE INVENTION

1. Field of the Invention

The present invention generally relates to a head module for a spacer ink, an ink feeding module and a spacer-forming apparatus having them incorporated therein.

2. Discussion of the Related Art

As a method for arranging a spacer on a substrate at predetermined positions to uniformly keep cell gaps between a color filter substrate and an array substrate of a liquid crystal display, there has been heretofore proposed a method for printing an ink having the spacer dispersed therein on the substrate by using a printing apparatus.

For the printing apparatus, an ink jet-type printer in which the ink is jetted out on printing positions through nozzles is generally used. If the spacer is not uniformly dispersed in the ink, discharging ink from the nozzle is not stabilized and problems occur (such as, discharging disorder, anomaly of discharging speed and/or direction, and instability of the number of spacers in drops of the ink liquid jetted from the nozzle).

For example, JP11-7028A describes a printer wherein a cooler and a piezoelectric element-based ultrasonic generator are provided for a stirring tank in which a spacer-containing solution is placed, the spacer-containing solution is stirred and dispersed inside the stirring tank with ultrasonic waves without rise in temperature, and the spacer is discharged. However, there is a problem in that the spacer sediments settle in the pipelines between the stirring tank and heads, head ink chambers, etc.

Although JP2002-72218A describes a printing apparatus in which an ink inside an ink chamber of a head can be circulated, there is another problem in that a head nozzle plate can become clogged with foreign matters mixed into the ink. Further, as the printing apparatuses have recently become larger, the ink feeding lines from ink bottles to head modules become longer so that settlement and aggregation of spacer inside the ink feeding lines cause various problems. The above-mentioned related art is disclosed in Japanese Patent Laid-Open Publication No. H11-7028, No. 2002-72218, No. 2002-277622 and No. JP2003-275659.

SUMMARY OF THE INVENTION

The present invention has been made to solve the above-described problems or drawbacks of the above-mentioned prior art, and its object is to provide a head module and a printing apparatus, which can maintain uniformly dispersed state of spacer particles without settlement of the spacer particles in an ink.

In order to solve the problems or drawbacks of the above prior art, a first invention of the present invention is a head module including a head body having a hollow interior, a nozzle plate constituting one wall surface of the head body, and a transporting system for transporting a spacer dispersed liquid fed from a storing system to the head body, wherein an ejection hole is formed in the nozzle plate. The spacer dispersed liquid transported in the interior of the head body is discharged through the ejection hole; and an internal filter through which the spacer dispersed liquid can pass is disposed in the interior of the head body. An inner space of the head body is divided into a discharging chamber on a side of the nozzle plate and a transporting chamber on a side opposite to the nozzle plate by the internal filter. An inlet through which the spacer dispersed liquid is fed and an outlet through which the spacer dispersed liquid is drained are provided in a wall face of the transporting chamber, while the openings are spaced from each other; and the transporting system comprises a pump for returning the spacer dispersed liquid drained through the outlet to the inlet.

The first invention is the head module constructed such that the transporting system includes a draining valve, and by switching the draining valve, a circulating state in which the spacer dispersed liquid is returned from the outlet to the inlet is changed to a draining state in which the spacer dispersed liquid is drained from the outlet to the storing system.

The first invention is the head module constructed such that spacer particles are dispersed in the spacer dispersed liquid; and passages are provided in the internal filter, the passages having diameters of twice or more as large as those of the spacer particles, and allowing the spacer dispersed liquid to pass therethrough. Also, the diameter of the ejection hole is set greater than those of the passages.

The first invention is a printing apparatus including a storing system in which a spacer dispersed liquid is stored, one or more head modules for discharging the spacer dispersed liquid, a feeding system connecting each of the one or more head modules to the storing system and feeding the spacer dispersed liquid to each of the one or more head modules, and a draining system connecting each of the one or more head modules to the storing system and returning the spacer dispersed liquid drained through the one or more heads to the storing system and constructed such that each of the one or more head modules comprises a feeding valve for switching permitting and stopping of feeding of the spacer dispersed liquid. When each of the feeding valves is set in a permitting state, the spacer dispersed liquid is fed from the feeding system to each of the at least one head module, the printing apparatus comprises a connecting system to connect the feeding system with the draining system. When each of the feeding valves is set in a stopping state, the spacer dispersed liquid is returned to the draining system through the connecting system without passing through each of the one or more head modules.

The first invention is the printing apparatus constructed such that the head module includes a head body with a hollow interior, a nozzle plate constituting one wall surface of the head body, and a transporting system for transporting the spacer dispersed liquid fed from the storing system to the head body. An ejection hole is provided in the nozzle plate; and the spacer dispersed liquid transported into the interior of the head body is discharged through the ejection hole. An internal filter through which the spacer dispersed liquid can pass is disposed in the interior of the head body; an inner space of the head body is divided into a discharging chamber on a side of the nozzle plate and a transporting chamber on a side opposite to the nozzle plate by the internal filter; an inlet through which the spacer dispersed liquid is fed and an outlet through which the spacer dispersed liquid is drained are provided in a wall face of the transporting chamber, while the openings are spaced from each other. The transporting system has a pump and a draining valve, and the pump being adapted for returning the spacer dispersed liquid drained through the outlet to the inlet, by switching the draining valve, a circulating state in which the spacer dispersed liquid is returned from the outlet to the inlet is changed to a draining state in which the spacer dispersed liquid is drained from the outlet to the storing system. When the draining valve is set in the circulating state and the feeding valve is set in stopping state, a circulation in which the spacer dispersed liquid is returned from the outlet to the inlet is simultaneously performed with a circulation in which the spacer dispersed liquid is returned to the draining system without passing the one or more head modules.

The first invention is directed to a printing apparatus including a storing system for storing a spacer dispersed liquid, one or more head modules for discharging the spacer dispersed liquid, a feeding system for connecting each of the one or more head modules to the storing system, and a draining system for connecting each of the one or more head modules to the storing system and returning the spacer dispersed liquid drained from the one or more head modules to the storing system and constructed such that each of the one or more head modules comprises a hollow head body, a nozzle plate constituted by one wall surface of the head body, a feeding path for feeding the spacer dispersed liquid from the feeding system to the head body, and a draining path for returning the spacer dispersed liquid drained from the head body to the draining system. The spacer dispersed liquid fed to the head body is discharged through an ejection hole provided in the nozzle plate; an internal filter is disposed in the interior of the head body; an inner space of the head body is divided into a discharging chamber on a side of the nozzle plate and a transporting chamber on a side opposite to the nozzle plate by the internal filter; a wall face of the transporting chamber is provided with an inlet through which the spacer dispersed liquid is fed from the feeding path and an outlet through which the spacer dispersed liquid is returned to the draining path, while the openings are spaced from each other; the feeding path and the draining path are connected to the inlet and the outlet, respectively; and the spacer dispersed liquid sent to the feeding path is passed through the transporting chamber before the spacer dispersed liquid is sent to the draining path.

The first invention is directed to the printing apparatus, wherein the feeding paths of the respective one or more head modules are connected to the feeding system successively along a direction in which the spacer dispersed liquid flows; and when a feeding valve of an upstream-side feeding path connected to the feeding system positioned an upstream side is closed and a feeding valve of a downstream-side feeding path connected to the feeding system positioned lower than the upstream-side feeding path is opened, the spacer dispersed liquid passes the transporting chamber connected to the downstream-side feed path without passing the transporting chamber connected to the upstream-side feeding path.

A second invention of the present invention is directed to a printing method including passing a spacer dispersed liquid fed to a transporting chamber of a head body through an internal filter, the head body being divided into the transporting chamber and a discharging chamber by the internal filter, thereby feeding the spacer dispersed liquid to the discharging chamber, discharging the spacer dispersed liquid toward an object to be printed through an ejection hole formed in the discharging chamber, draining at least a part of the spacer dispersed liquid fed to the transporting chamber from the transporting chamber in a printing state in which the spacer dispersed liquid is discharged to the object to be printed, and feeding the spacer dispersed liquid to the discharging chamber and draining the spacer dispersed liquid fed to the discharging chamber from the discharging chamber in a waiting state that the spacer dispersed liquid is not discharged to the object to be printed.

The second invention is directed to the printing method, wherein in the waiting state, the spacer dispersed liquid is also fed to the transporting chamber, and the spacer dispersed liquid fed to the transporting chamber is drained.

The second invention is directed to the printing method, wherein the spacer dispersed liquid drained from the transporting chamber is returned to either one or both of the discharging chamber and the transporting chamber.

The second invention is directed to the printing method, wherein the spacer dispersed liquid drained from the discharging chamber is returned to either one or both of the discharging chamber and the transporting chamber.

The second invention is directed to the printing method, wherein in the waiting state, the spacer dispersed liquid drained from the discharging chamber and the spacer dispersed liquid drained from the transporting chamber are mixed; and thereafter, the mixture is returned to both the discharging chamber and the transporting chamber.

The second invention is a head module including a head body with a hollow interior, a nozzle plate constituting one wall surface of the head body, one or more ejection holes formed in the nozzle plate, a feeding section for feeding a spacer dispersed liquid into the interior of the head body, and a draining section for draining the spacer dispersed liquid from the interior of the head body and constructed such that the spacer dispersed liquid fed from the feeding section is discharged through the one or more ejection holes, wherein an inner space of the head body is divided into a discharging chamber on a side of the nozzle plate and a transporting chamber on a side opposite to the nozzle plate by an internal filter through which the spacer dispersed liquid can pass, the feeding section comprises a discharging-side inlet provided in the discharging chamber and a feeding-side inlet provided in the transporting chamber, the spacer dispersed liquid is fed to the discharging chamber through the discharging-side inlet, and is fed to the transporting chamber through the feeding-side inlet. The draining section comprises a discharging-side outlet provided in the discharging chamber and a feeding-side outlet provided in the transporting chamber; and the spacer dispersed liquid is drained from each of the discharging chamber and the transporting chamber through the discharging-side outlet and the feeding-side outlet.

The second invention is directed to the head module, which comprises a circulating system and is constructed such that the circulating system is adapted to return the spacer dispersed liquid drained to the draining section and to the feeding section.

The second invention is the head module wherein the circulating system is constructed to mix the spacer dispersed liquid drained through the discharging-side outlet and the spacer dispersed liquid drained through the feeding-side outlet and to return the mixture to the feeding section.

The second invention is the head module constructed such that the circulating system further comprises a buffer chamber in which the spacer dispersed liquid is stored, the spacer dispersed liquid stored in the buffer chamber is fed to the feeding section, and the spacer dispersed liquid drained through the draining section is returned to the buffer chamber.

The second invention is directed to a printing apparatus including a storing system in which a spacer dispersed liquid is stored, and one or more head modules to which the spacer dispersed liquid is fed from the storing system and constructed such that each of the one or more head modules comprises a head body having a hollow interior, a nozzle plate constituting one wall surface of the head body, one or more ejection holes provided in the nozzle plate, a feeding section for feeding the spacer dispersed liquid in the interior of the head body, and a draining section for draining the spacer dispersed liquid from the interior of the head body. The printing apparatus is constructed such that the spacer dispersed liquid fed from the feeding section is discharged through the one or more ejection holes; an inner space of the head body is divided into a discharging chamber on a side of the nozzle plate and a transporting chamber on a side opposite to the nozzle plate by an internal filter through which the spacer dispersed liquid can pass; the feeding section comprises a discharging-side inlet provided in the discharging chamber and a feeding-side inlet provided in the transporting chamber, and the spacer dispersed liquid is fed to the discharging chamber through the discharging-side inlet and is fed to the transporting chamber through the feeding-side inlet; and the draining section comprises a discharging-side outlet provided in the discharging chamber and a feeding-side outlet provided in the transporting chamber, wherein the spacer dispersed liquid is drained from each of the discharging chamber and the transporting chamber through the discharging-side outlet and the feeding-side outlet.

The second invention is directed to the printing apparatus including a circulating system for returning the spacer dispersed liquid drained to the draining section and to the feeding section and is constructed such that the spacer dispersed liquid is fed from the storing system to the circulating system.

The spacer dispersed liquid can be stably fed to the head body, while the spacer particles are not aggregated or settled in the spacer dispersed liquid in which the spacer particles are dispersed. Consequently, the spacer discharging apparatuses using plural heads for large-size substrates can be put into practical use.

DETAILED DESCRIPTION OF THE PREFERRED EMBODIMENTS

First, preferred embodiments of the first invention will be explained in detail below.

Figure 2:
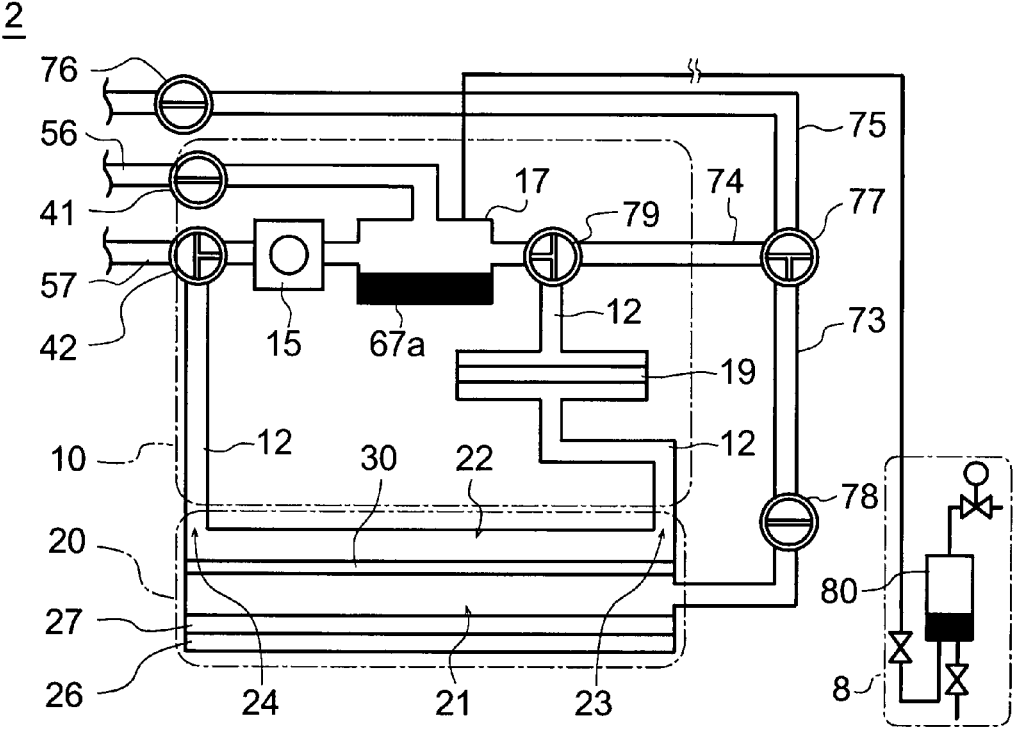
FIG. 2 is an illustration of another embodiment of the head module according to the first invention.

A reference number 2 of FIG. 2 shows a head module according to the first invention. This head module 2 includes a head body 20, a nozzle plate 26, a small discharging chamber 27, a transporting system 10, a feeding valve 41, and a draining valve 42.

The interior of the head body 20 is made hollow, and the nozzle plate 26 is constituted by a bottom wall being one wall surface of the head body 20. The small discharging chamber 27 is arranged above that surface of the nozzle plate 26 which is directed toward the interior of the head body 20. The small discharging chamber 27 is provided with a piezoelectric element, and a spacer dispersed liquid is discharged as later discussed.

An internal filter 30 is disposed inside the head body 20 such that it is spaced from both the small discharging chamber 27 above the nozzle plate 26 and a wall surface on a ceiling side of the head body 20. Thus, the inner space of the head body 20 is divided into two spaces: a space between the internal filter 30 and the ceiling-side wall surface and a space between the internal filer 30 and the small discharging chamber 27.

A reference number 21 of FIG. 2 indicates a discharging chamber which is surrounded by the nozzle plate 26, the internal filter 30 and a sidewall of the head body 20 and in which the small discharging chamber 27 is arranged. A reference number 22 of the same figure indicates a transporting chamber 22, which is surrounded by the ceiling-side wall surface of the head body 20 being the wall surface opposite to the nozzle plate 26, the internal filter 30 and the sidewall of the head body 20.

In this embodiment, the ceiling-side wall surface of the head body 20 is long and narrow, and opposite end portions in the longitudinal direction of the ceiling-side wall surface are provided with through-holes, respectively. The through-hole formed at one end portion constitutes an inlet 23 through which the spacer dispersed liquid is passed into the transporting chamber 22. The through-hole formed at the other end portion constitutes an outlet 24 through which the spacer dispersed liquid is passed out the transporting chamber 22.

Since the diameter of each of the inlet 23 and the outlet 24 is far smaller than the length of the ceiling-sidewall surface, the inlet 23 and the outlet 24 are located away from each other.

The transporting system 10 includes a transporting path 12, and a buffer chamber 17 provided on the way of the transporting path 12. One end of the transporting path 12 is connected to the inlet, and the other end is connected to the outlet 24. One end of a feeding path 56 is connected to the buffer chamber 17, and a feeding valve 41 is provided on the way of the feeding path 56. In a shutdown state where the feeding valve 41 is closed and the buffer chamber 17 is shut off from a feeding system discussed below, no spacer dispersed liquid is fed to the buffer chamber 17. In a permitted state where the feeding valve 41 is opened and the buffer chamber 17 is connected to the feeding system, the spacer dispersed liquid of the feeding system is fed into the buffer chamber 17 so that the spacer dispersed liquid may be stored inside the buffer chamber 17.

The head module 2 includes an ultrasonic irradiator (not shown), and the spacer dispersed liquid stored in the buffer chamber 17 is stirred by ultrasonic vibration with the ultrasonic irradiator. Consequently, the spacer particles are not settled, but kept dispersed inside the buffer chamber 17.

A temperature controller (not shown) is attached to the buffer chamber 17 so that when the temperature of the spacer dispersed liquid stored in the buffer chamber 17 rises, the buffer chamber 17 is cooled with the temperature controller, and the spacer-dispersed liquid inside the buffer chamber 17 is cooled through the heat conduction. Therefore, even if the spacer dispersed liquid inside the buffer chamber 17 is heated through the ultrasonic irradiation, the temperature of that spacer dispersed liquid is always kept constant.

The head module 2 has a liquid amount sensor (not shown) to detect the amount of the liquid inside the buffer chamber 17. When the liquid amount inside the buffer chamber 17 does not reach a stipulated range, the feeding valve 41 is switched to the permitted state. To the contrary, when the liquid amount inside the buffer chamber 17 exceeds the stipulated range, the feeding valve is switched to the shutdown state. Therefore, when the liquid amount inside the buffer chamber 17 decreases due to the printing, the spacer dispersed liquid is supplemented from the feeding system so that the liquid amount inside the buffer chamber 17 may be kept always in the stipulated range. A reference number 67*a* of FIG. 2 indicates the spacer dispersed liquid stored in the buffer chamber 17. FIG. 2 shows the state in which the liquid amount of the spacer dispersed liquid 67*a* does not reach the stipulated range, and the feed valve 41 is switched to the permitted state.

When the liquid amount of the spacer dispersed liquid 67*a* is in the stipulated range, a connecting opening of the transporting path 12 on a side of the inlet 23, which is one of two connecting openings of the transporting path 12 connected to the buffer chamber 17, is located under the liquid surface of the spacer dispersed liquid 67*a*.

Here, since the head body 20 is located below the buffer chamber 17, the spacer dispersed liquid 67*a* inside the buffer chamber 17 flows down into the transporting path 12 through the connecting opening of the transporting path 12 on the side of the inlet 23, and reaches the inlet 23. When the spacer dispersed liquid is fed into the transporting chamber 22 through the inlet 23, it flows between the inlet 23 and the outlet 24.

Figure 3:
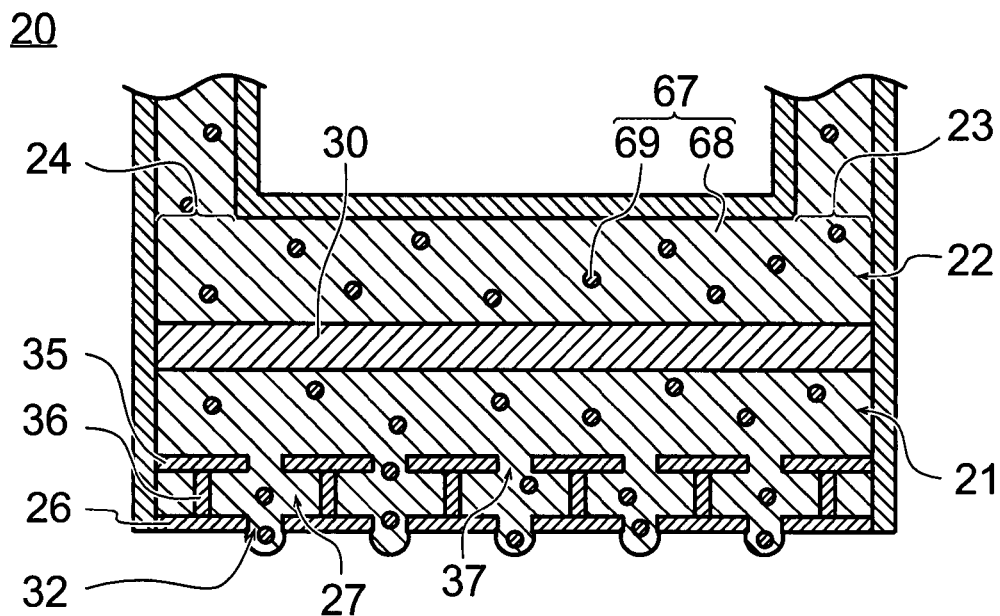
FIG. 3 is an enlarged sectional view of an embodiment of the head body used in the first invention.

FIG. 3 is an enlarged sectional view of the head body 20. The internal filter 30 is constituted by a filter that has passages in it to allow the solution to pass, as in a case of a metallic mesh filter or an unwoven cloth. A part of the spacer dispersed liquid flowing from the inlet 23 toward the outlet 24 is transported to the discharging chamber 21 through the passages of the internal filter 30.

A reference number 67 of FIG. 3 indicates the spacer dispersed liquid. The spacer dispersed liquid 67 is constituted by a solvent 68 and spacer particles 69 dispersed in the solvent 68. The passages of the internal filter 30 are sized twice or more as large as the diameters of the spacer particles 69 so that the spacer dispersed liquid 67 is carried to the discharging chamber 21 in the state that the spacer particles 69 are dispersed.

A piezoelectric supporting plate 35 having plural holes 37 is disposed between the nozzle plate 26 and the internal filter 30, while being spaced from the nozzle plate 26. The small discharging chamber 27 is located between the nozzle plate 26 and the piezoelectric supporting plate 35.

The nozzle plate 26 is provided with one or more ejection holes 32. In this embodiment, there are plural ejection holes 32, and one small discharging chamber 27 is provided above each of the ejection holes 32, respectively. A piezoelectric element 36 of the small discharging chamber 27 is provided at a position near each of the ejection holes 32, and the spacer dispersed liquid 67 can be discharged through a desired ejection hole 32 by vibrating the piezoelectric element 36 located near that desired ejection hole 32. Meanwhile, the piezoelectric elements 35 may be provided as partition walls to separate the adjacent small discharging chambers 27 from each other, or may be provided on side walls of the small discharging chambers 27.

When the spacer dispersed liquid 67 is discharged to consume the spacer dispersed liquid inside the discharging chamber 21, the level of a surface (meniscus) at which the spacer dispersed liquid 67 inside the ejection hole 32 contacts the atmosphere changes.

A reference number 8 of FIG. 2 indicates a meniscus controlling mechanism, and the buffer chamber 17 is connected to a tank 80 of the meniscus controlling mechanism 8. The liquid surface level of the spacer dispersed liquid or a solvent stored in the tank 80 changes in conjunction with the level of the above-discussed meniscus.

The liquid surface level of the spacer dispersed liquid 67*a* inside the buffer chamber 17 is detected by a liquid surface sensor (not shown), and the spacer dispersed liquid or the solvent is fed from the tank 80 to the buffer chamber 17 by means of a depressurizing mechanism linked to the liquid surface sensor so that the meniscus may be returned to a predetermined level.

That is, according to this head module 2, feeding of the spacer dispersed liquid from a feeding system 51 to the head module 2 is controlled, and the amount of the liquid inside the head module 2 is finely adjusted by the meniscus controlling mechanism 8. Consequently, the liquid amount inside the head module 2 is kept always constant so that the spacer dispersed liquid 67 is stably discharged. That portion of the spacer dispersed liquid which has passed the transporting chamber 22, but has not yet been fed to the discharging chamber 21, is returned to the transporting path 12 through the outlet 24.

The draining valve 42 is attached to a position between the outlet 24 of the transporting path 12 and the buffer chamber 17.

A reference number 57 of FIG. 2 indicates a draining path having one end connected to a draining system mentioned later, and the other end of the draining path 57 is connected to the transporting path 12 via the draining valve 42. In the case of a draining state in which the transporting path 12 is connected to the draining system by switching the draining valve 42, the spacer dispersed liquid returned to the transporting path 12 through the outlet 24 is drained to the draining system via the draining path 57. On the other hand, in the case of a circulating state in which the transporting path 12 is shut off from the draining system by switching the draining valve 42, the spacer dispersed liquid returned to the transporting path 12 through the outlet 24 does not flow out to the draining path 57.

A circulating pump 15 is attached to the transporting path 12 at a position between the outlet 24 and the buffer chamber 17 so that the spacer dispersed liquid returned to the transporting path 12 is forced out into the buffer chamber 17 by means of the circulating pump 15 in the above circulating state.

Since the spacer dispersed liquid forced out into the buffer chamber 17 is sent toward the inlet 23 again, the spacer dispersed liquid 67 is circulated between the buffer chamber 17 and the transporting chamber 22 when the circulating pump 15 is driven in the circulating state.

Further, an external filter 19 is provided between the inlet 23 and the buffer chamber 17. The external filter 19 is adapted to pass the spacer particles, but remove matters (including dust and aggregated spacer particles) larger in size than the spacer particles. Therefore, only the spacer dispersed liquid 67 in which the spacer particles are dispersed reaches the inlet 23.

Next, a printing apparatus according to the first invention using this head module 2 will be explained. A reference number 1 of FIG. 1 indicates one embodiment of the printing apparatus according to the first invention.

The printing apparatus includes a storing system 5, a circulating path 50 and one or more head modules 2 mentioned above. This embodiment includes four head modules 2, and the head modules and members therefor are discriminated from one another by attaching suffixes "a" to "d", respectively, thereto.

The storing system 5 includes a storing tank 58 and a buffer tank 59. Inside the storing tank 58 is stored a spacer dispersed liquid in which spacer particles being resin particles are dispersed in a solvent. The spacer dispersed liquid is fed from the storing tank 58 to the buffer tank 59 by means of a feeding pump 79. The spacer liquid is once stored inside the buffer tank 59, and an excess portion of the liquid stored in the buffer tank 59 is returned to the storing tank 58.

A stirrer (not shown) is provided in each of the storing tank 58 and the buffer tank 59. The spacer dispersed liquid stored inside each of the storing tank 58 and the buffer tank 59 is stirred constantly by the stirrer so that the spacer particles are not settled, thereby keeping the dispersed state.

A circulating path 50 is constituted by a pipe of which one and the other ends are connected to the buffer tank 59, and a large circulating pump 55 is provided on the way of the circulating path 50. When the large circulating pump 55 is driven, the spacer dispersed liquid in the buffer tank 59 is sucked into one end of the circulating path 50, flows toward the other end inside the circulating path 50, and is thereafter returned to the buffer tank 59 through the other end.

Assuming that a side of the circulating path 50 into which the spacer dispersed liquid is sucked is taken as "upstream" and that a side of the circulating path through which the spacer dispersed liquid is drained into the buffer tank 59 is taken as "downstream", feeding paths 56a to 56d for the respective head modules 2a to 2d are connected to one end side of the upstream portion of the circulating path 50 successively one by one from the upstream side toward the downstream side.

Figure 1:
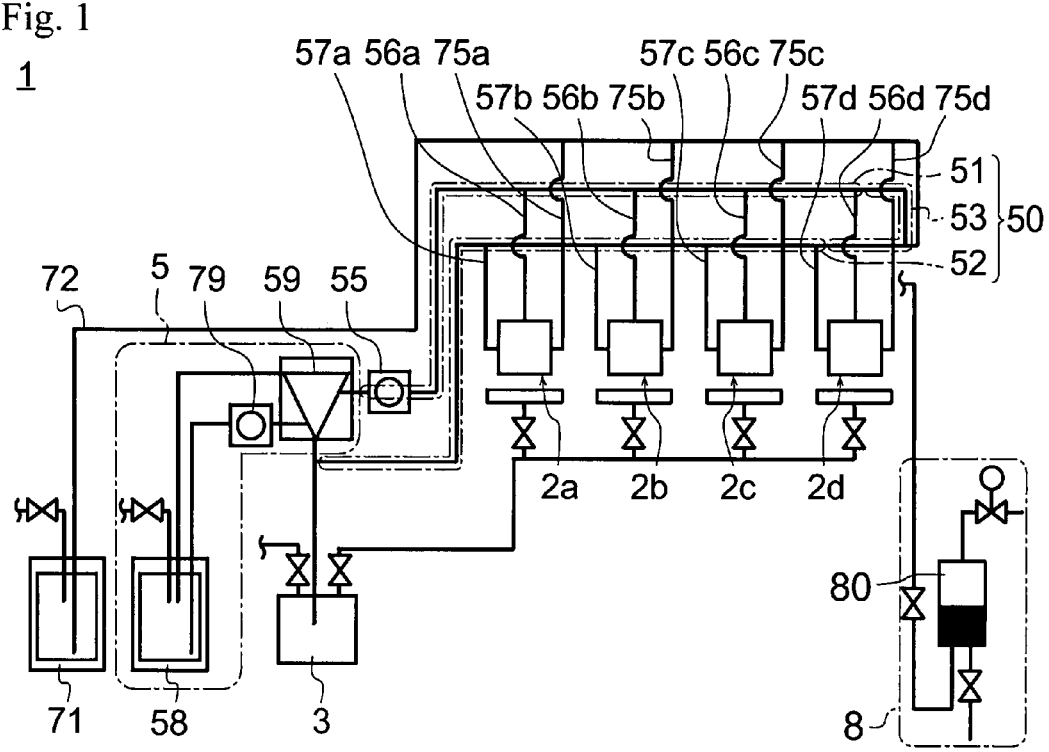
FIG. 1 is an illustration of an embodiment of the printing apparatus according to the first invention.

A reference number 51 of FIG. 1 indicates a feeding system which is a part of the circulating path 50 upstream of the position where the feeding path 56d on the most downstream side is connected. The spacer dispersed liquid flowing through the feeding system 51 is fed to the buffer chamber 17 of the head module 2a to 2d through the feeding paths 56a to 56d.

The draining paths 57a to 57d of the head modules 2a to 2d are connected to the circulating path 50 at positions downstream the feeding system 51 successively one by one from the upstream side toward the downstream side. A reference number 52 of FIG. 1 indicates a draining system which is a portion of the circulating path 50 downstream of the position where the draining path 57d on the most upstream side is connected. The spacer dispersed liquid drained from each of the head modules 2a to 2d is returned to the draining system 52.

The draining path 57d on the most upstream side is connected to the circulating path 50 at a position downstream of the feeding path 56d on the most downstream side. Therefore, the spacer dispersed liquid, which has passed the feeding system 51 without being fed to the head modules 2a to 2d, is drained to the draining system 52 through a portion between the feeding path 56d on the most downstream side and the draining path 57d on the most upstream side in the circulating path 50. A reference number 53 of FIG. 1 indicates a connecting system which is a portion of the circulating path 50 between the feeding path 56d on the most downstream side and the draining path 57d on the most upstream side and which connects the feeding system 51 to the draining system 52.

Next, one example of printing steps with the spacer dispersed liquid by using this printing apparatus 1 will be described. The large circulating pump 55 is driven in the state that each of the feed valves 41 is set in the permitted state and each of the draining valves 42 is set in the circulating state. The flow rate of the spacer dispersed liquid flowing through the feeding system 51 is set to a flow rate at which the spacer dispersed liquid is sufficiently fed to all of the feeding path 56d positioned on the most upstream side to the feed path 56d on the most downstream side, even when the feeding paths 56a to 56d are set in the permitted state. Thus, the spacer dispersed liquid is stored in the buffer chamber 17 of each of the head modules 2a to 2d.

When the circulating pump 15 is driven in the state that each of the feeding valves 41 is set in the shutdown state and each of the draining valves 42 is set in the circulating state, the spacer dispersed liquid is circulated between the buffer chamber 17 and the transporting chamber 22 inside each of the head modules 2a to 2d as mentioned above.

A substrate to be printed is arranged on the position opposed to the nozzle plate 20 of each head module 2a to 2d and the spacer dispersed liquid is discharged through the ejection hole 32 immediately above the printing position of the substrate where the substrate is to be printed. Thus, the spacer dispersed liquid is applied to the printing position of the substrate (printing).

Since the spacer particles are likely to be settled, the spacer particles are separated if the spacer dispersed liquid is not moved inside the head body. As a result, the number of the spacer particles discharged per one shot through the ejection hole 32 varies. However, when the spacer dispersed liquid is constantly circulated between the buffer chamber 17 and the transporting chamber 22 on printing, the spacer dispersed liquid does not undergo the settlement inside the head module 2.

When the spacer dispersed liquid is kept circulated as discussed above, it flows constantly inside the transporting chamber 22. However, since the amount at which the circulating pump 15 forces out the spacer dispersed liquid is constant, the flow rate of the spacer dispersed liquid flowing through the transporting chamber 22 varies between when the spacer dispersed liquid is discharged through the ejection hole 32 and when it is not discharged through the ejection hole.

The discharged amount through the ejection hole 32 is controlled by the vibration of the liquid level with the piezoelectric element 36. However, if the flow rate of the spacer dispersed liquid passing above the ejection hole 32 changes, the pressure applied to the ejection hole 32 also changes so that the discharged amount through the ejection hole 32 departs from an estimated range.

According to the first invention, since the spacer dispersed liquid is caused to flow in the transporting chamber 22 divided from the discharging chamber 21 by the internal filter 30, the pressure applied to the ejection hole 32 is not influenced even if the flow rate of the spacer dispersed liquid flowing through the transporting chamber 22 slightly changes. Accordingly, the amount of the liquid which is controlled with the piezoelectric element 36 can always be discharged through the ejection hole 32, thereby resulting in the stable discharging. If the large circulating pump 55 is constantly driven on printing, the spacer dispersed liquid is fed to the feeding system 51. When the amount of the liquid in the buffer chamber 17 becomes less than the stipulated level due to the discharging through the ejection hole 32, the feed valve 41 is set in the permitted state; and thus, the buffer chamber 17 is kept storing with the spacer dispersed liquid.

Further, when the feed valve 41 is set in the shutdown state, the spacer dispersed liquid flowing through the feeding system 51 is sent to the draining system 52 through the connecting system 53 without passing the head modules 2a to 2d, and then returned to the buffer tank 59.

In this way, the spacer dispersed liquid is circulated between the circulating path 50 and the buffer tank 59 without staying inside the circulating path 50, even when the spacer dispersed liquid is not sent into the head modules 2a to 2d. Thus, the spacer particles do not sediment on the way of the circulating path 50.

Since the spacer particles are likely to be settled, it is preferable to constantly maintain the circulation between the circulating path 50 and the buffer tank 59 and the circulation inside each of the head modules 2a to 2d, if the printing is shut down for a short time period.

A washer is hereinafter explained, the washer being adapted to wash the interior of the printing apparatus 1 in order to shut down the printing apparatus 1 for a long-term. For this purpose, the printing apparatus 1 includes a washing tank 71 in which a washing liquid (such as, an organic solvent) is placed as well as a washing path 72 for transporting the washing liquid, in addition to the feeding system 51.

Referring to FIGS. 1 and 2, one end of a washing pipe 75 for each of the head modules 2a to 2d is connected to the washing path 72. When a switching valve 76 provided in the washing pipe 75 is opened, the washing liquid is fed to the washing pipe 75 through the washing path 72.

The washing pipe 75 is branched into a discharging-side pipeline 73 connected to the discharging chamber 21 and a transporting path-side pipeline 74 connected to the transporting path 12. When a branching valve 77 is switched to shut the washing pipe 75 off from the transporting path-side pipeline 74 and connect it to the discharging-side pipeline 73, the washing liquid flows into the discharging-side pipeline 73. When a discharging-side valve 78 of the discharging-side pipeline 73 is opened, the washing liquid is fed into the discharging chamber 21 and the interior of the discharging chamber 21 is washed with the washing liquid. The washing liquid having performed the washing is drained outside through the ejection hole 32.

The transporting path-side pipe line 74 is connected to the transporting path 12 between the buffer chamber 17 and the external filter 19. The branching valve 77 is switched to feed the washing liquid to the transporting path-side pipeline 74, and the transporting path-side valve 79 to connect the transporting path-side pipeline 74 to the transporting path 12 is switched to flow the washing liquid toward the external filter 19 of the transporting path 12. Thus, the external filter 19 and the transporting chamber 22 are washed with the washing liquid. At this time, if the draining valve 42 is set in a draining state, the spacer dispersed liquid having performed the washing is drained to the draining system 52, and then drained to a drain 3 from the draining system 52.

Heretofore, explanation has been made on the case where the spacer dispersed liquid is fed simultaneously to each of the head modules 2a to 2d for performing the printing, but the first invention is not limited to the above. It may be that printing is performed through selecting one or more of the plural head modules; and after the printing, further printing is performed by means of the remaining head module(s).

The circulating pump 15 is not limited to the case where the spacer dispersed liquid is forced out, but it may be that the circulating pump 15 sucks the spacer dispersed liquid and circulates it through the transporting path 12, or two kinds of pumps are provided: one to force out the spacer dispersed liquid and the other to suck it. Further, the circulating pump is not limited to the installation position between the outlet 24 and the buffer chamber 17 as long as it is provided on the way of the transporting path 12. In summary, the circulating pump 15 may be any one in which it circulates the spacer dispersed liquid provided between the transporting system 10 and the transporting chamber 22.

As discussed above, description has been made on the case where the spacer circulated liquid is circulated within the head module 2, but the first invention is not limited thereto.

Figure 4:
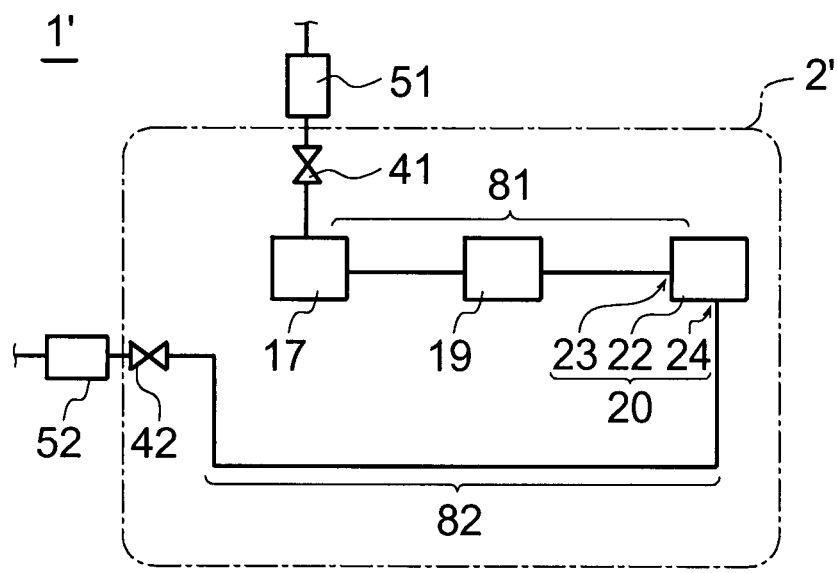
FIG. 4 is a block diagram illustrating another embodiment of the printing apparatus according to the first invention.

A reference number 2' of FIG. 4 indicates a head module to be used in another embodiment of the printing apparatus 1'. This head module 2' has the same structure as in the head module 2 shown in FIG. 2, including a buffer chamber 17, an external filter 19 and a head body 20. A transporting chamber 22 of the head body 20, the external filter 19 and the buffer chamber 17 are connected to a feeding system 51 and a draining system 52 in series. When the feed valve 41 is set in a permitted state, the spacer dispersed liquid fed through the feeding system 51 is fed into the transporting chamber 22 through the buffer chamber 17, the external filter 19 and an inlet 23. After being passed through the interior of the transporting chamber, the spacer dispersed liquid is drained to the draining system 52 through the outlet 24 without being returned to the buffer chamber 17.

A reference number 81 of FIG. 4 indicates a feeding path to feed the spacer dispersed liquid to the inlet 23 through the feeding system 51, and a reference number 82 of the same figure indicates a draining path to send the spacer dispersed liquid to the draining system 52 through the outlet 24.

The printing apparatus 1' has the same structure as in the printing apparatus 1 shown in FIG. 1 except for the head module 2'. The spacer dispersed liquid returned to the draining system 52 is sent back to the buffer tank 59, and fed to the feeding system 51 again by the operation of the large circulating pump 55. That is, in the printing apparatus 1', the spacer dispersed liquid is circulated among the storing system 5, the feeding system 51, the feeding path 81, the transporting chamber 22, the draining path 82 and the draining system 52. Thus, since the spacer dispersed liquid does not stay, the spacer particles are hardly settled. Therefore, when the printing is performed while the spacer dispersed liquid is being circulated, the number of the spacer particles in the liquid drops discharged through the ejection hole 32 does not vary.

In this printing apparatus 1', two or more head modules 2' may be connected to the same feeding system 51 and the same draining system 52. In this case, when the feeding valve 41 of the head module 2' located on the upstream side of the feeding system 51 is set in the permitted state, the spacer dispersed liquid is preferably fed to that head module 2'. When the feeding valve 41 of the head module 2' located on the upstream side is shut off, the spacer dispersed liquid flowing through the feeding system 51 preferably flows into the head module 2', which is located on the downstream side of and adjacent to that one. Further, if the amount of the spacer dispersed liquid flowing through the feeding system 51 is set sufficiently large, it can be fed simultaneously to the plural head modules 2' so that the spacer dispersed liquid can be circulated among one storing system 5, one feeding system 51, plurality of the head modules 2' and one draining system 52.

Although the kind of the spacer particles to be used in the first invention is not particularly limited, spacer particles having a diameter of, for example, 4 μm or more and 6 μm or less can be used.

In the first invention, the kind of internal filter 30 is not particularly limited, either. Various materials (such as, an unwoven cloth, a metallic filter, etc.) can be used as long as they hardly adsorb the spacer particles in the spacer dispersed liquid. The diameters of passages allowing the spacer particles to pass are preferably twice or more as large as those of the spacer particles.

According to the first invention, the shape or the size of the ejection hole 32 is not particularly limited. Considering the stable discharging, the ejection hole having the diameter twice or more as large as that of the passage of the internal filter 30 is preferable. Meanwhile, the size of the ejection hole 32 of the nozzle plate 26 can be selected depending upon the target size of the discharged liquid drop, and the diameter of the ejection hole is preferably 2 μm or more and 40 μm or less.

Further, in the first invention, the ultrasonic irradiation may be performed inside the buffer chamber 17 only when the printing is performed by the head module 2 thereof, or the irradiation may be continued during even when the printing is not performed by the head module 2. When the ultrasonic irradiation is performed, it may be continuously or intermittently performed.

Heretofore, explanation has been made on the case where the temperature controller is provided for the buffer chamber 17 only, but the first invention is not limited to this. For example, a temperature controller can be provided in the external filter 19, the external filter 19 is heated or cooled based on the measured temperature of the spacer dispersed liquid, and thereby the spacer dispersed liquid passed through the external filter 19 is set to a preset temperature. The temperature of the spacer dispersed liquid may be controlled in either one or both of the buffer chamber 17 and the external filter 19.

As discussed above, the description has been made on the case where the discharging through the ejection hole 32 is controlled by the piezoelectric element system with the piezoelectric element provided near the ejection hole 32. The discharging control method in the first invention is not limited to this. Various systems such as a BUBBLE JET system, a thermal jet system, or the like may be adopted.

Printing is performed with a commercially available spacer dispersed liquid by the printing apparatus 1 shown in FIGS. 1 and 2, and the numbers of the spacer particles in the discharged liquid drops were evaluated.

In this case, the spacer dispersed liquid was prepared by dispersing the commercially available spacer particles produced for the application of spacers in an alcoholic mixed solvent and preliminarily filtering aggregated masses with filter. The thus prepared spacer dispersed liquid having the spacer particles with the particle diameter of 4.1 μm and the spacer particle concentration of 0.1 wt % is used.

When the diameter of the nozzle (ejection hole 32) is 28 μm, the size of the discharged liquid drop is 20 pl, and the number of the spacers per one liquid drop is 3.2±0.2. Further, when the diameter of the nozzle is 23 μm, the size of the discharged liquid drop is 8 pl, and the number of the spacers per one liquid drop is 2.0±0.9. It is understood from these results that the size of the discharged liquid drop and the number of the spacers in the liquid drop can be controlled by changing the diameter of the nozzle.

The spacer dispersed liquid was continuously discharged through the ejection hole 32 by using the printing apparatus 1 shown in FIGS. 1 and 2 with respect to a case where the circulation of the spacer dispersed liquid was performed in both the circulating path 50 and the head module 2 (Example 1), a case where the circulation of the spacer dispersed liquid was performed only in the circulating path 50 (Comparative Example 1), and a case where the circulation of the spacer dispersed liquid was performed in both the circulating path 50 and the head module 2 and simultaneously ultrasonic waves were irradiated to the spacer dispersed liquid stored in the buffer chamber 17 (Example 2). The evaluation was performed as to the numbers of the spacers in the liquid drops during the continuous discharging.

Results are shown in the following Table 1.

TABLE 1

Number of spacers in liquid drop under various perational conditions (First invention)

| | Initial stage | lapsed time | | | After maintenance |
|---|---|---|---|---|---|
| | | 10 min | 30 min | 60 min | |
| Comparative example 1 | 2.0 ± 0.9 | 2.0 ± 1.0 | 1.9 ± 1.0 | 1.5 ± 1.0 | 2.0 ± 0.9 |
| Example 1 | 2.0 ± 0.9 | 2.0 ± 0.9 | 2.0 ± 0.9 | 1.9 ± 0.9 | 2.0 ± 0.9 |
| Example 2 | 2.0 ± 0.9 | 2.0 ± 0.9 | 2.0 ± 0.9 | 2.0 ± 0.9 | 2.0 ± 0.9 |

As is clear from the above Table 1, it was observed in Comparative Example 1 in which the spacer dispersed liquid was not circulated in the head module 2 that the number of the spacers was decreased from the initial number of 2.0±0.9 to 1.5±1.0 after 60 minutes. On the other hand, it was observed in Example 1 in which the spacer dispersed liquid was circulated in the head module 2 that the number of the spacers was 1.9±0.9 after 60 minutes and that the decrease in the number of the spacers was lessened. Further, in Example 2 in which the ultrasonic irradiation was performed during the circulation inside the head module 2, the stably discharging effect was confirmed with no change even after 60 minutes.

After the continuous discharging of 60 minutes, the ultrasonic irradiation in the head module 2, the circulation of the spacer dispersed liquid, and flushing of the head module 2 are performed for each printing apparatus of Examples 1 and 2, and Comparative Example 1 and then, the number of the spacers was evaluated again. The number of the spacers is returned to the initial number of 2.0±0.9 by the maintenance even in the case that no circulation was performed within the head module 2.

In this manner, it is understood that the discharging stability is improved by circulating the spacer dispersed liquid inside the head module 2, and preferably further irradiating ultrasonic waves to the spacer dispersed liquid inside the head module 2.

Next, preferred embodiments of the second invention will be described in detail below.

Figure 6:
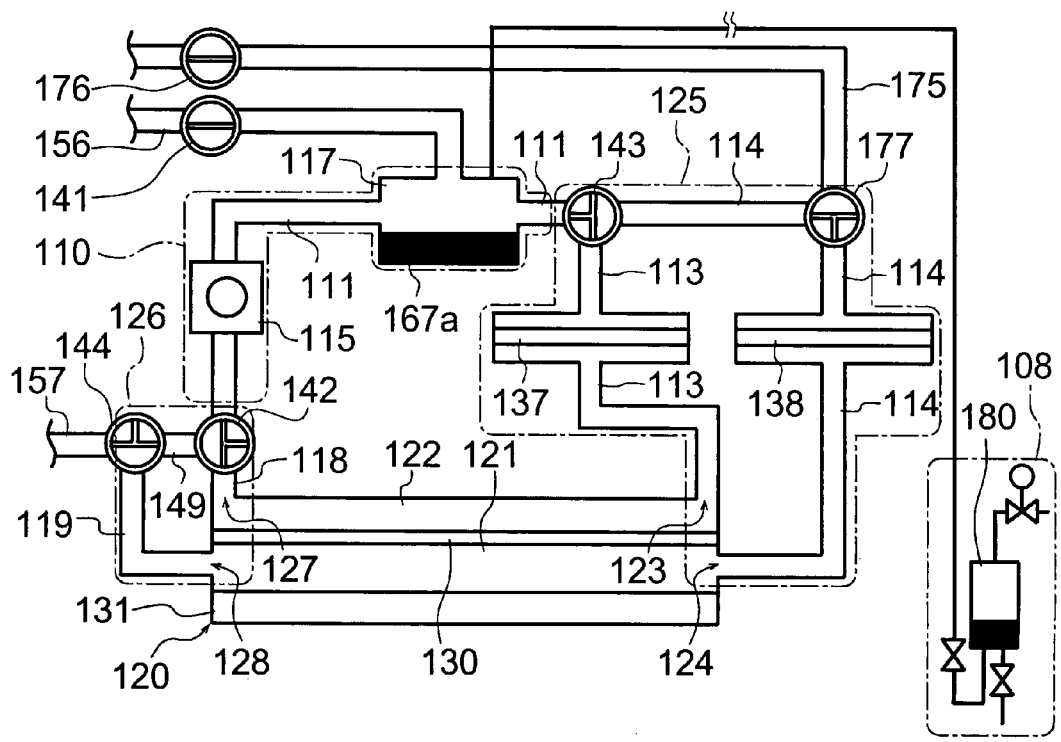
FIG. 6 is a figure illustrating an embodiment of the head module according to the second invention.

A reference number 102 of FIG. 6 indicates one embodiment of the head module according to the second invention. This head module 102 includes a head body 120, a nozzle plate 131, a feeding section 125, a draining section 126 and a circulating section 110.

The interior of the head body 120 is made hollow, and the nozzle plate 131 is constituted by one wall face of the head body 120. An internal filter 130 is disposed inside the head body 120, while it is spaced from both the nozzle plate 131 and a wall surface of the head body 120 on a side opposite to the nozzle plate 131. Thus, the interior of the head body is divided into a space between the internal filter 130 and the wall surface and a space between the internal filter 130 and the nozzle plate 131.

A reference number 121 of FIG. 6 indicates a discharging chamber surrounded by the nozzle plate 131, the internal filter 130 and sidewalls of the head body 120. A reference number 122 of the same figure indicates a transporting chamber surrounded by the wall surface of the head body 120 on the side opposite to the nozzle plate 131, the internal filter 130 and the sidewalls of the head body 120.

A circulating system 110 includes a circulating path 111, and a buffer chamber 117 provided on the way of the circulating path 111. One end of a feeding path 156 is connected to the buffer chamber 117. When a feed valve 141 provided in the feeding path 156 is opened, the buffer chamber 117 is connected a large circulating path 150 mentioned later so that the spacer dispersed liquid flowing through the large circulating path 150 flows into the buffer chamber 117.

When the liquid amount of the spacer dispersed liquid flown into the buffer chamber 117 exceeds a preset value, it flows out one end side of the circulating path 111. The buffer chamber 117 is connected to a meniscus controlling mechanism 108 discussed later, which exchanges the spacer dispersed liquid or a solvent between the buffer chamber 117 so as to finely adjust the meniscus.

When the spacer dispersed liquid or the solvent from the meniscus controlling mechanism 108 is fed to the buffer chamber 117, it is mixed with the spacer dispersed liquid fed through the large circulating path 150 inside the buffer chamber 117, and stored therein.

A reference number 167a of FIG. 6 indicates the spacer dispersed liquid stored in the buffer chamber 117.

One end of the circulating path 111 is connected to the feeding section 125, and the other end connected to the draining section 126. In two connecting openings of the circulating path 111 which are connected to the buffer chamber 117, one connecting opening on the feeding section side is positioned under the liquid surface of the spacer dispersed liquid 167a when the liquid amount of the spacer dispersed liquid inside the buffer chamber 117 is in a preset range mentioned later.

Since the buffer chamber 117 is located above the feeding section 125, the spacer dispersed liquid 167a inside the buffer chamber 117 flows down into the circulating path 111 through the connecting opening of the circulating path 111 on the side of the feeding section 125.

The feeding section 125 includes first and second feeding pipes 113 and 114, a feeding-side switching valve 143, a feeding-side inlet 123, and a discharging camber-side inlet 124. One end of each of the first and second feeding pipes 113, 114 is connected to one end of the circulating path 111. The feeding-side switching valve 143 is provided at a connecting position among the first and second feeding pipes 113 and 114 and the circulating path 111. The feeding-side inlet 123 is provided in a wall face of the transporting chamber 122, and the other end of the first feeding pipe 113 is connected to the feeding-side inlet 123. The discharging chamber-side inlet 124 is provided in a wall face of the discharging chamber 121, and the other end of the second feeding pipe 114 is connected to the discharging chamber-side inlet 124.

Therefore, the transporting chamber 122 is connected to the feeding-side switching valve 143 via the feeding-side inlet 123 and the first feeding pipe 113. The discharging chamber 121 is connected to the feeding-side switching valve 143 via the discharging chamber-side inlet 124 and the second feeding pipe 114. Thus, the buffer chamber 117 is connected to either one or both of the discharging chamber 121 and the transporting chamber 122 via the circulating path 111 by switching the feeding-side switching valve 143 so that the spacer dispersed liquid flowing through the circulating path 111 is flown into either one or both of the discharging chamber 121 and the transporting chamber 122.

First and second external filters 137, 138 are provided on the way of the first and second feeding pipes 113, 114 so that aggregated particle masses of the spacer particles or dust is removed when the spacer dispersed liquid passes the external filters 137 and 138. Therefore, the spacer dispersed liquid in which the dust is removed and the spacer particles are dispersed is fed into the discharging chamber 121 and the transporting chamber 122.

Figure 7:
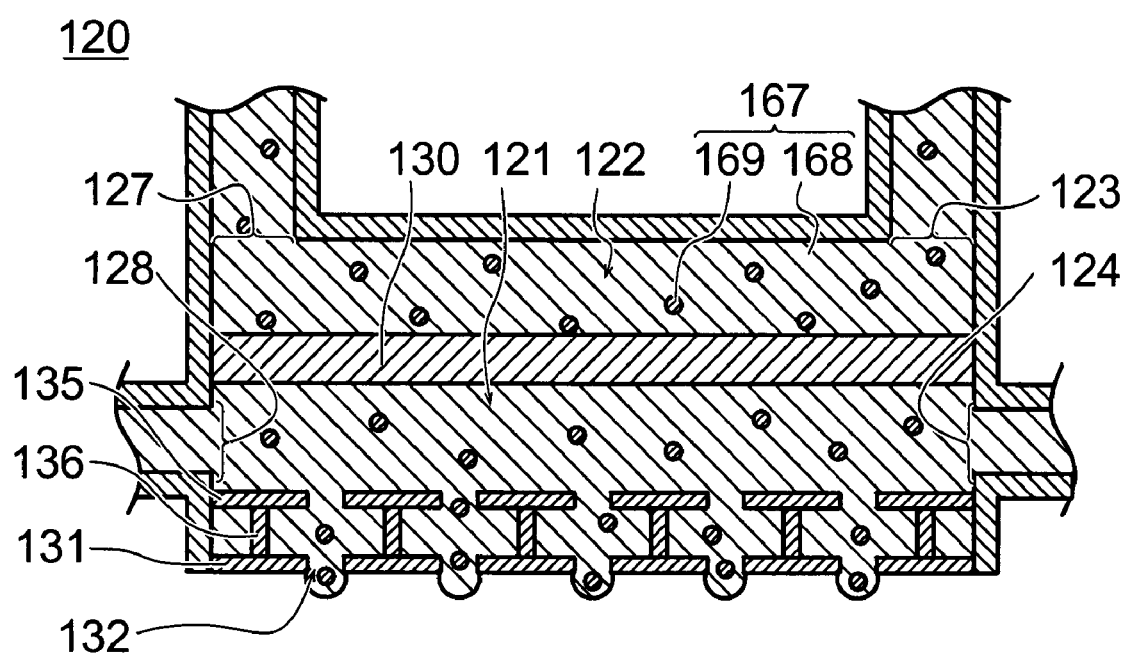
FIG. 7 is an enlarged sectional view illustrating an embodiment of the head body used in the second invention.

Referring to FIG. 7, one or more ejection holes 132 are provided in the nozzle plate 131.

A piezoelectric supporting plate 135 having plural holes is provided above the nozzle plate 131, and piezoelectric elements 136 are provided at positions near the ejection holes 132, respectively, between the nozzle plate 131 and the piezoelectric supporting plate 135 above the nozzle plate 131. In the state when the printing is stopped, the pressure near the ejection hole 132 is lowered below a predetermined pressure by the piezoelectric element 136 so that the spacer dispersed liquid may not be discharged through the ejection hole 132.

The draining section 126 includes a transporting chamber-side outlet 127, a discharging chamber-side outlet 128, and first and second draining pipes 118, 119. The transporting chamber-side outlet 127 on the side of the transporting chamber is provided in the wall face of the transporting chamber 122 at a position spaced from the feeding-side inlet 123. The discharging chamber-side outlet 128 on the side of the discharging chamber is provided in the wall face of the discharging chamber 121 at a position spaced from the discharging chamber-side inlet 124.

One end of the first draining pipe 118 is connected to the transporting chamber-side outlet 127, and the spacer dispersed liquid flown inside the transporting chamber 122 from the feeding-side inlet 123 toward the transporting chamber-side outlet 127 is drained to the first draining pipe 118.

One end of the second draining pipe 119 is connected to the discharging chamber-side outlet 128, and the spacer dispersed liquid that passes inside the discharging chamber 121 from the discharging chamber-side inlet 124 toward the discharging chamber side outlet 128 is drained to the second draining pipe 119.

The other end of the first draining pipe 118 is connected to an end of the circulating path 111 opposite to the end to which the first and second feeding pipes 113, 114 are connected. The other end of the second draining pipe 119 is connected to one end of the draining path 157 of which the other end is connected to the large circulating path mentioned later.

A connecting position where the first draining pipe 118 is connected to the circulating path 111 and a connecting position where the second draining pipe 119 is connected to the draining path 157 are connected to each other by a connecting pipe 149.

Switching valves 142 and 144 are provided at the connecting positions, respectively. By switching the switching valve 142 provided at the connecting position between the first draining pipe 118 and the circulating path 111 and the switching valve 144 provided at the connecting position between the second draining pipe 119 and the draining path 157, the discharging chamber 121 and the transporting chamber 122 are connected to either the circulating path 111 or the draining path 157. Accordingly, the spacer dispersed liquid drained from the transporting chamber 122 to the first draining pipe 118 is drained into either the circulating path 111 or the draining path 157, the spacer dispersed liquid drained from the discharging chamber 121 to the second draining pipe 119 is drained into either the circulating path 111 or the draining path 157.

In this embodiment, a circulating pump 115 is provided at a position of the circulating path 111 between the draining section 126 and the buffer chamber 117, and the spacer dispersed liquid drained into the circulating path 111 from the draining section 126 is returned to buffer chamber 117 and directed again to the feeding section 125 by the operation of the circulating pump 115.

Therefore, when the spacer dispersed liquid is not drained from the draining section 126 to the draining path 157, the spacer dispersed liquid is circulated among the buffer chamber 117, the feeding section 125 and the draining section 126.

The buffer chamber 117 is equipped with a stirrer (not shown). When the stirrer is operated, ultrasonic waves are intermittently or continuously irradiated to the spacer dispersed liquid inside the buffer chamber 117 so that the spacer dispersed liquid is stirred by the ultrasonic waves, and the spacer particles become uniformly dispersed.

Therefore, each of the spacer dispersed liquid fed freshly through the large circulating path 150 and the spacer dispersed liquid returned to the buffer chamber 117 from the draining section 126 is uniformly dispersed inside the buffer chamber 117 and is circulated inside the head module 102.

The buffer chamber 117 is provided with a temperature controller (not shown). When the temperature of the spacer dispersed liquid inside the buffer chamber 117 exceeds a preset temperature, the buffer chamber 117 is cooled with the temperature controller so that the spacer dispersed liquid therein is cooled through the heat conduction. Therefore, even if the spacer dispersed liquid inside the buffer chamber 117 is heated by the ultrasonic vibration, its temperature is always maintained at a constant temperature.

Next, an explanation will be made on one embodiment of a printing apparatus using the head module 102.

Figure 5:
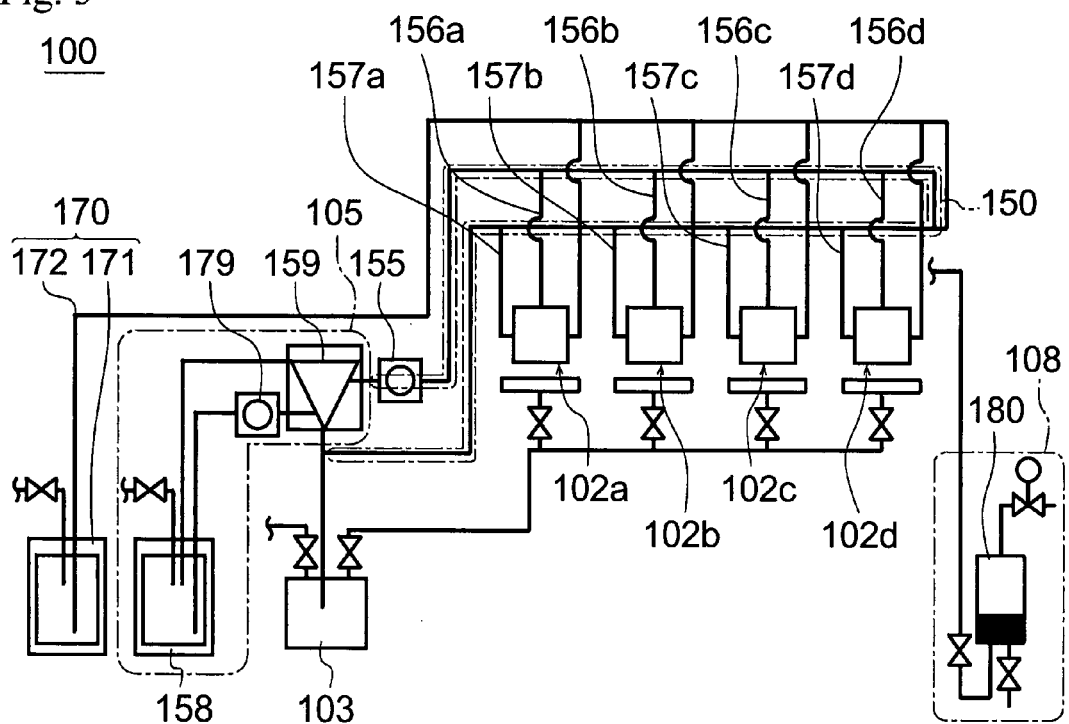
FIG. 5 is a figure illustrating an embodiment of the printing apparatus according to the second invention.

A reference number 100 of FIG. 5 indicates one embodiment of the printing apparatus according to the second invention. This printing apparatus 100 includes a storing system 105, a large circulating path 150, and one or more head modules 102 as discussed above. In this embodiment, the printing apparatus 100 includes four head modules 102, and the head modules 102 and members therefor are distinguished from one another by attaching suffixes "a" to "d", respectively, thereto.

The storing system 105 includes a storing tank 158 and a buffer tank 159. The spacer dispersed liquid is stored inside the storing tank 158, and this spacer dispersed liquid is fed from the storing tank 158 to the buffer tank 159 by means of a feeding pump 179. The spacer dispersed liquid is once stored in the buffer tank 159, and an excess portion of the liquid stored in the buffer tank 159 is returned to the storing tank 158.

Each of the storing tank 158 and the buffer tank 159 includes a stirrer (not shown), and the spacer dispersed liquid stored in each of the storing tank 158 and the buffer tank 159 is stirred with the stirrer so that a dispersed state in which the spacer particles are uniformly dispersed is maintained.

Both ends of the large circulating path 150 are connected to the buffer tank 159. When a large circulating pump 155 provided in the large circulating path 150 is driven, the spacer dispersed liquid stored in the buffer tank 159 is sucked into the large circulating path 150, and is returned to the buffer tank 159 after flowing through the large circulating path 150 from one end toward the other. That is, the spacer dispersed liquid is circulated between the buffer tank 159 and the large circulating path 150 by the operation of the large circulating pump 155.

Assume that a side of the large circulating path 150 to which the spacer dispersed liquid is fed from the buffer tank 159 is taken as an upstream side and that the other end side through which the spacer dispersed liquid is returned to the buffer tank 159 is taken as a downstream side. Feed paths 156a to 156d of the respective head modules 102a to 102d are connected to the large circulating path 150 successively from the upstream side toward the downstream side. When the large circulating path 150 is connected to the buffer chambers 117 by opening the feeding valves 141 provided in the feeding paths 156a to 156d, the spacer dispersed liquid flows into the buffer chambers 117 from the large circulating path 150.

The large circulating path 150 is designed to flow the spacer dispersed liquid in an amount greater than the total amount of the spacer dispersed liquids flowing through the feeding paths 156a to 156d. Therefore, when all the feeding valves 141 are opened simultaneously, the spacer dispersed liquid reaches not only the upstream-side feeding path 156a but also the downstream-side feeding path 156d. As a result, the spacer dispersed liquid is fed to all the head modules 102a to 102d.

The buffer chamber 117 is provided with a liquid amount controller (not shown). The liquid amount controller detects the amount of the liquid inside the buffer chamber 117, and when the liquid amount is lower than a preset range, the spacer dispersed liquid is fed to the buffer chamber 117 by connecting the buffer chamber 117 to the large circulating path 150. On the other hand, when the liquid amount inside the buffer chamber 117 exceeds the preset range, the feeding of the spacer dispersed liquid is stopped by shutting the buffer chamber 117 off from the large circulating path 150.

Further, a buffer liquid such as the spacer dispersed liquid, a solvent or the like is stored in a tank 180 of a meniscus controlling mechanism 108. The level of the surface of the buffer liquid inside the tank 180 changes in conjunction with the level of that surface (meniscus) of the spacer dispersed liquid which contacts the atmosphere inside an ejection hole 132. The meniscus controlling mechanism 180 feeds the buffer liquid in an amount corresponding to the changed amount from the tank 180 to the buffer chamber 117 by means of a depressurizing mechanism so that the meniscus is always kept in a constant state.

That is, according to this head module 102, the liquid amount inside the head module 102 is always kept constant by controlling the feeding of the spacer dispersed liquid from the large circulating path 150 to the head module 102 and also finely adjusting the liquid amount inside the head module 102 with the meniscus controlling mechanism 108. As a result, the spacer dispersed liquid is stably discharged.

Draining paths 157a to 157d for the head modules 102a to 102d are connected to the large circulating path 150 at positions downstream of the feeding path 156d located on the most downstream side. When the spacer dispersed liquid drained from the draining section 126 of each of the respective head modules 102a to 102d is drained to the large circulating path 150, it is returned to the buffer tank 159 again.

Meanwhile, this printing apparatus 100 includes a washing mechanism 170 for washing each of the head modules 102a to 102d. The washing mechanism 170 includes a washing tank 171 filled with a washing liquid (such as, an organic solvent), and a washing path 172 having one end connected to the washing tank 171 and the other end connected to the large circulating path 150, respectively.

Here, the washing path 172 is connected to the large circulating path 150 at a position between the connecting positions of the feeding paths 156a to 156d and the connecting positions of the draining paths 157a to 157d.

The washing liquid in the washing tank 171 is passed through the washing line 172 and the large circulating path 150, and drained to a drain tank 103 through the large circulating path 150 before being sent to the buffer tank 159.

One end of a washing pipe for each of the head modules 102a to 102d is connected to the washing path 172. Referring to FIG. 6, one head module 102 will be explained. When a switching valve 176 provided on the way of the washing pipe 175 is opened, the washing liquid in the washing path 172 is fed to the washing pipe 175.

In this embodiment, the other end of the washing pipe 175 is connected to the way of the second feeding pipe 114, and a switching valve 177 provided at the connecting position and the feeding-side switching valve 143 are switched to connect the washing pipe 175 to either one or both of the first and second feeding pipes 113 and 114 to feed the washing liquid therein. Simultaneously, the feeding pipes connected to the washing pipe 175 are shut off from the buffer chamber 117 to stop the feeding of the spacer dispersed liquid.

As discussed above, the first feeding pipe 113 is connected to the transporting chamber 122, and the second feeding pipe 114 is connected to the discharging chamber 121. Therefore, when the washing liquid is fed to the first and second feeding pipes 113, 114, the washing liquid is fed to the discharging chamber 121 and the transporting chamber 122. Consequently, the spacer dispersed liquid remaining therein is forcedly passed through with the washing liquid, and drained to the first and second draining pipes 118, 119 together with other impurities.

When the washing liquid drained into the first and second draining pipes 118, 119 is drained to the draining path 157 by switching the switching valves 142, 144' in the draining section 126, the washing liquid is drained into the large circulating path 150 through the draining path 157, and is drained into the drain tank 103 without returning to the buffer tank 159 through the large circulating path 150.

Next, an explanation will be made on a method for discharging the spacer dispersed liquid on a substrate as an object to be printed, by using this printing apparatus 100.

The large circulating pump 155 is driven, and while the spacer dispersed liquid is being circulated between the large circulating path 150 and the buffer tank 159, the amount of the liquid inside the buffer chamber 117 of each of the head modules 102a to 102d is kept constant by the above-discussed liquid amount controller.

When the circulating pump 115 of each of the head modules 102a to 102d is driven in this state and the feeding-side switching valve 143 and the switching valves 142, 144 in the draining section 126 are switched so that the first and second feeding pipes 113, 114 and the first and second draining pipes 118, 119 are connected to the buffer chamber 117. The spacer dispersed liquid flows into the interiors of both the discharging chamber 121 and the transporting chamber 122. The spacer dispersed liquid that flows into the discharging chamber 121 and flows into the transporting chamber 122 are mixed in the same circulating path 111, passed through the buffer chamber 117, and sent to the side of the feeding section 125 again.

At this time, since the spacer dispersed liquid is kept in the flowing state without staying in the discharging chamber 121 or in the transporting chamber 122, the spacer particles are kept dispersed without being settled in the liquid.

While this state is being kept, the nozzle plate 131 of each of the head modules 102a to 102d is opposed to a substrate as an object to be printed, and is aligned such that the ejection hole 132 is opposed to a printing position of the substrate.

When the piezoelectric element 136 corresponding to the ejection hole 132 immediately above the printing position is vibrated, the spacer dispersed liquid 167 is discharged toward the printing position through the ejection hole 132.

Immediately before the spacer dispersed liquid 167 is discharged through the ejection hole 132, when the switching valve 143 on the feeding side and the switching valves 142, 144 of the draining section 126 are switched to shut the discharging chamber 121 off from both of the draining path 157 and the buffer chamber 117 while the spacer dispersed liquid is kept circulated between the buffer chamber 117 and the transporting chamber 122, the spacer dispersed liquid flows inside the transporting chamber 122, but does not flow in the discharging chamber 121.

When the above state is kept during the spacer dispersed liquid 167 is being discharged through the ejection hole 132 (printing state), the ejection hole 132 does not undergo influence due to change in pressure by the flow of the spacer dispersed liquid 167. Therefore, a predetermined amount of the spacer dispersed liquid 167 can be discharged through the ejection hole 132.

When the spacer dispersed liquid 167 is discharged through the ejection hole 132, the liquid amount of the spacer dispersed liquid inside the discharging chamber 121 decreases. However, since the internal filter 130 is formed with passages (not shown) through which the spacer particles 169 and the solvent 168 in the spacer dispersed liquid can pass, the spacer dispersed liquid 167 is supplemented into the discharging chamber 121 through the passages of the internal filter 130.

In the printing state, the spacer dispersed liquid 167 is fed to the transporting chamber 122 from the buffer tank 117, and the liquid amount of the spacer dispersed liquid inside the buffer tank 117 is always kept constant by the liquid amount controller and the meniscus controlling mechanism 108 as mentioned above. Thus, the constant amount of the spacer dispersed liquid 167 is always placed inside the discharging chamber 121. As a result, the meniscus inside the ejection hole 132 is always kept constant, and the spacer dispersed liquid is stably discharged.

When the discharging of the preset amount of the spacer dispersed liquid to the printing position is terminated, the printing state is finished by stopping the discharging through the ejection hole 132.

Next, when the feeding-side switching valve 143 and the switching valves 142, 144 of the discharging section 126 are switched so as to connect both of the transporting chamber 122 and the discharging chamber 121 to the buffer chamber 117, the spacer dispersed liquid is fed to both the transporting chamber 122 and the discharging chamber 121; and thereafter, the spacer disposed liquid is circulated to be returned to the same buffer tank 117, while the spacer dispersed liquid flows both inside the transporting chamber 122 and inside the discharging chamber 121.

In the waiting state in which the printing is stopped for a relatively short time period, for example, during replacement of the printed substrate with a fresh substrate or during alignment of the substrate as discussed above, the spacer particles are not settled inside the discharging chamber 121 or the transporting chamber 122 since the spacer dispersed liquid flows inside the transporting chamber 122 and the discharging chamber 121. Consequently, the internal filer 130 or the ejection hole 132 is not clogged.

When the printing is stopped for a few hours or more, the interior filter 130 or the ejection hole 132 is not clogged with the spacer particles by draining the spacer dispersed liquid inside the transporting chamber 121 and inside the discharging chamber using the above-discussed washing mechanism 170, even if the large circulating pump 150 and/or the circulating pump 115 is stopped.

In case that the printing apparatus 100 includes plural head modules 102a to 102d, a wide printing position of a large-scale substrate can be printed with the spacer dispersed liquid by simultaneously printing with the use of all the head modules 102a to 102d. On the other hand, in case that printing is performed through the selection of one or more of the plural head modules 102a to 102d, the head modules 102a to 102d are not clogged with the spacer particles, if the head module 102a to 102d not for printing is put in the above-discussed waiting state.

As discussed above, an explanation has been made on the case where the temperature controller is provided for the buffer chamber 117 only. However, the second invention is not limited to this. For example, when either one or both of the first and second external filters 137, 138 are provided with temperature controllers and either one or both of the first and second external filters 137, 138 are heated or cooled based on the measured temperature of the spacer dispersed liquid, the spacer dispersed liquid passed through the first and second external filters 137, 138 can be controlled to the preset temperature. The temperature of the spacer dispersed liquid may be controlled in any one or more of the buffer chamber 117 and the external filters 137, 138.

The kind of the spacer particles used in the second invention is not particularly limited, and those having diameters of not less than 4 μm and not more than 6 μm can for example, be used.

The kind of the internal filter 130 used in the second invention is not particularly limited, and various ones (such as, an unwoven cloth and a metallic filter, etc). can be used. Diameters of the passages through which the spacer particles are passed are preferably twice or more as large as those of the spacer particles.

In the second invention, the shape or the size of the ejection hole 132 are not particularly limited, but considering the stably discharging performance, the ejection hole preferably has the diameter of twice or more as large as those of the passages of the internal filter 130. The size of the ejection hole 132 of the nozzle plate 126 can be selected depending upon the size of the discharged liquid drop desired, but the diameter of the ejection hole is preferably 20 μm or more and 40 μm or less.

Further, in the second invention, the ultrasonic waves may be irradiated in the present buffer chamber 117 only when the printing is performed by the head module 102, or may be continuously irradiated therein even if the printing is not performed by the head module 102. The ultrasonic waves may be continuously irradiated or may be intermittently irradiated.

The above explanation has been made on the case where the discharging through the ejection hole 132 is controlled according to the piezoelectric element system in which the piezoelectric element 132 is provided near the ejection hole 132. However, the discharging-controlling method in the second invention is not limited to this. Various systems such as the BUBBLE JET system, the thermal jet system or the like can be employed.

Printing was performed with a commercially available spacer dispersed liquid by the printing apparatus 100 shown in FIGS. 5 and 6, and evaluation was made on the numbers of the spacers in the discharged liquid drop.

In this case, the spacer dispersed liquid was prepared by dispersing the commercially available spacer particles produced for the application of spacers in an alcoholic mixed solvent and preliminarily filtering aggregated masses with a filter. The thus prepared spacer dispersed liquid having the spacer particles with the particle diameter of 4.1 μm and the spacer particle concentration of 0.1 wt % is used.

When the diameter of the nozzle (spouting nozzle 132) was 28 μm, the size of the discharged liquid drop is 20 pl, and the number of the spacers in one liquid drop is 3.2±0.2.

Further, when the diameter of the nozzle is 23 μm, the size of the discharged liquid drop is 8 pl, and the number of the spacers in one liquid drop is 2.0±0.9.

These results revealed that the size of the discharged liquid drops and the number of the spacers can be easily controlled by changing the diameter of the nozzle.

The spacer dispersed liquid was continuously discharged through the ejection hole 32 for 60 minutes by using the printing apparatus 100 shown in FIGS. 5 and 6 with respect to the following conditions: a case where the spacer dispersed liquid flows inside the transporting chamber 122 while it was circulated through the large circulating path 150 (Example 3), a case where the circulation of the spacer dispersed liquid was performed only in the large circulating path 150 while the spacer dispersed liquid did not flow inside the transporting chamber 122 (Comparative Example 2), and a case where the circulation of the spacer dispersed liquid was performed in the large circulating path 150, while the spacer dispersed liquid flows inside the transporting chamber 122, and simultaneously ultrasonic waves were irradiated to the spacer dispersed liquid stored in the buffer chamber 17 (Example 4). Evaluation was performed as to the numbers of the spacers in the liquid drops during the continuous discharging.

In each of Examples 3 and 4, the flowing of the spacer dispersed liquid into the discharging chamber 121 was stopped immediately before the spacer dispersed liquid was discharged through the ejection hole 132.

Results are shown in the following Table 2.

TABLE 2

Number of spacers in liquid drop under various perational conditions (Second invention)

| | Initial stage | lapsed time | | | After maintenance |
|---|---|---|---|---|---|
| | | 10 min | 30 min | 60 min | |
| Comparative example 2 | 2.0 ± 0.9 | 2.0 ± 1.0 | 1.9 ± 1.0 | 1.5 ± 1.0 | 2.0 ± 0.9 |
| Example 3 | 2.0 ± 0.9 | 2.0 ± 0.9 | 2.0 ± 0.9 | 1.9 ± 0.9 | 2.0 ± 0.9 |
| Example 4 | 2.0 ± 0.9 | 2.0 ± 0.9 | 2.0 ± 0.9 | 2.0 ± 0.9 | 2.0 ± 0.9 |

As is clear from the above Table 2, it is observed in Comparative Example 2 in which the spacer dispersed liquid does not flow in the transporting chamber 122 on printing that the number of the spacers was decreased from the initial number of 2.0±0.9 to 1.5±1.0 after 60 minutes. On the other hand, it was observed in Example 3 in which the spacer dispersed liquid flows in the transporting chamber 122 that the number of the spacers is 1.9±0.9 after 60 minutes and the decrease in the number of the spacers is lessened. Further, in Example 4 in which the ultrasonic irradiation is performed, while the spacer dispersed liquid flows in the transporting chamber 122, the stably discharging effect is confirmed with no change even after 60 minutes.

After the continuous discharging of 60 minutes, the ultrasonic irradiation in the head module 102, the circulation of the spacer dispersed liquid, and flushing of the head module 102 are performed for each printing apparatus of Example 3 and 4, and Comparative Example 2 and then, the number of the spacers was evaluated again. The number of the spacers is returned to the initial number of 2.0±0.9 by the maintenance even in the case where no circulation was performed within the head module 102.

As discussed above, it is understood that the discharging stability on printing can be improved when the spacer dispersed liquid flows in the transporting chamber 122; and preferably, ultrasonic waves are irradiated to the spacer dispersed liquid inside the head module 102.

What is claimed is:

1. A head module, comprising:
a head body having a hollow interior;
a nozzle plate including one wall surface of the head body;
a transporting system for transporting a spacer dispersed liquid fed from a storing system to the head body,
wherein an ejection hole is formed in the nozzle plate, and
wherein the spacer dispersed liquid transported in the inside of the head body is discharged through the ejection hole;
an internal filter through which the spacer dispersed liquid can pass disposed in the interior of the head body,
wherein an inner space of the head body is divided into a discharging chamber on a side of the nozzle plate and a transporting chamber on a side opposite to the nozzle plate by the internal filter; and
an inlet through which the spacer dispersed liquid is fed and an outlet through which the spacer dispersed liquid is drained are formed in a wall face of the transporting chamber while the inlet and the outlet are spaced from each other,
wherein the transporting system comprises a pump for returning the spacer dispersed liquid drained through the outlet to the inlet.

2. The head module according to claim 1,
wherein the transporting system further comprises a draining valve, and
wherein, by switching the draining valve, a circulating state in which the spacer dispersed liquid is returned from the outlet to the inlet is changed to a draining state in which the spacer dispersed liquid is drained from the outlet to the storing system.

3. The head module according to in claim 1,
wherein spacer particles are dispersed in the spacer dispersed liquid, the head module further comprising:
passages formed in the internal filter, the passages having diameters of twice or more as large as the diameters of the spacer particles, and allowing the spacer dispersed liquid to pass therethrough,
wherein the diameter of the ejection hole is set greater than those of the passages.

4. A printing apparatus comprising:
a storing system in which a spacer dispersed liquid is stored;
at least one head module for discharging the spacer dispersed liquid;
a feeding system for connecting the at least one head module to the storing system and feeding the spacer dispersed liquid to each of the at least one head module;
a draining system for connecting the at least one head module to the storing system and returning the spacer dispersed liquid drained through the at least one head module to the storing system,
wherein each of the at least one head module includes a feeding valve for switching between the permitting and stopping of feeding the spacer dispersed liquid, and
wherein the spacer dispersed liquid is fed from the feeding system to the at least one head module when each of the feeding valves is set in a permitting state; and
a connecting system to connect the feeding system with the draining system,
wherein the spacer dispersed liquid is returned to the draining system through the connecting system without passing through the at least one head module when each of the feeding valves is set in a stopping state.

5. The printing apparatus according to claim 4, wherein the head module comprises:
a head body with a hollow interior;
a nozzle plate including one wall surface of the head body;
a transporting system for transporting the spacer dispersed liquid fed from the storing system to the head body,
wherein an ejection hole is formed in the nozzle plate, and
wherein the spacer dispersed liquid transported into the interior of the head body is discharged through the ejection hole;
an internal filter through which the spacer dispersed liquid can pass is disposed in the inside of the head body;
an inner space of the head body is divided into a discharging chamber on a side of the nozzle plate and a transporting chamber on a side opposite to the nozzle plate by the internal filter; and
an inlet through which the spacer dispersed liquid is fed and an outlet through which the spacer dispersed liquid is drained are formed in a wall face of the transporting chamber while the inlet and the outlet are spaced from each other,
wherein the transporting system comprises a pump for returning the spacer dispersed liquid drained through the outlet to the inlet,
wherein, by switching the draining valve, a circulating state in which the spacer dispersed liquid is returned from the outlet to the inlet is changed to a draining state in which the spacer dispersed liquid is drained from the outlet to the storing system, and
wherein a circulation that the spacer dispersed liquid is returned from the outlet to the inlet is simultaneously performed with a circulation that the spacer dispersed liquid is returned to the draining system without passing the one or more head modules when the draining valve is set in the circulating state and the feeding valve is set in stopping state.

6. A printing apparatus, comprising
a storing system for storing a spacer dispersed liquid;
at least one head module for discharging the spacer dispersed liquid,
a feeding system for connecting the at least one head module to the storing system; and
a draining system for connecting the at least one head module to the storing system and returning the spacer dispersed liquid drained from the at least one head module to the storing system,
wherein the at least one head module comprises:
a hollow head body;
a nozzle plate including by one wall surface of the head body;
a feeding path for feeding the spacer dispersed liquid from the feeding system to the head body;
a draining path for returning the spacer dispersed liquid drained from the head body to the draining system,
wherein the spacer dispersed liquid fed to the head body is discharged through an ejection hole formed in the nozzle plate;
an internal filter disposed in the interior of the head body,
wherein an inner space of the head body is divided into a discharging chamber on a side of the nozzle plate and a transporting chamber on a side opposite to the nozzle plate by the internal filter; and
an inlet through which the spacer dispersed liquid is fed and an outlet through which the spacer dispersed liquid is drained are formed in a wall face of the transporting chamber while the inlet and the outlet are spaced from each other, wherein the feeding path and the draining path are connected to the inlet and the outlet, respectively, and wherein the spacer dispersed liquid sent to the feeding path is passed through the transporting chamber before the spacer dispersed liquid is sent to the draining path.

7. The printing apparatus according to claim 6, wherein the feeding paths of the at least one head module are respectively connected to the feeding system successively along a direction in which the spacer dispersed liquid flows, and wherein when a feeding valve of an upstream-side feeding path connected to the feeding system positioned an upstream side is closed and a feeding valve of a downstream-side feeding path connected to the feeding system positioned lower than the upstream-side feeding path is opened, the spacer dispersed liquid passes the transporting chamber connected to the downstream-side feed path without passing the transporting chamber connected to the upstream-side feeding path.

8. A printing method, comprising the steps of:

passing a spacer dispersed liquid fed to a transporting chamber of a head body through an internal filter, the head body being divided into the transporting chamber and a discharging chamber by the internal filter, and then, feeding the spacer dispersed liquid to the discharging chamber, discharging the spacer dispersed liquid toward an object to be printed through an ejection hole formed in the discharging chamber;

draining at least a part of the spacer dispersed liquid fed to the transporting chamber from the transporting chamber in a printing state that the spacer dispersed liquid is discharged to the object to be printed; and feeding the spacer dispersed liquid to the discharging chamber and draining the spacer dispersed liquid fed to the discharging chamber from the discharging chamber in a waiting state in which the spacer dispersed liquid is not discharged to the object to be printed.

9. The printing method according to claim 8, wherein in the waiting state, the spacer dispersed liquid is also fed to the transporting chamber, and the spacer dispersed liquid fed to the transporting chamber is drained.

10. The printing method according to claim 8, wherein the spacer dispersed liquid drained from the transporting chamber is returned to at least one of the discharging chamber and the transporting chamber.

11. The printing method according to claim 8, wherein the spacer dispersed liquid drained from the discharging chamber is returned to at least one of the discharging chamber and the transporting chamber.

12. The printing method according to claim 9, wherein in the waiting state, the spacer dispersed liquid drained from the discharging chamber and the spacer dispersed liquid drained from the transporting chamber are mixed, and thereafter the mixture is returned to both the discharging chamber and the transporting chamber.

13. A head module, comprising:

a head body with a hollow interior;

a nozzle plate constituting one wall surface of the head body;

at least one ejection hole formed in the nozzle plate;

a feeding section for feeding a spacer dispersed liquid into the interior of the head body; and a draining section for draining the spacer dispersed liquid from the interior of the head body, wherein the spacer dispersed liquid fed from the feeding section is discharged through the at least one ejection hole, wherein an inner space of the head body is divided into a discharging chamber on a side of the nozzle plate and a transporting chamber on a side opposite to the nozzle plate by an internal filter through which the spacer dispersed liquid can pass, wherein the feeding section comprises a discharging-side inlet provided in the discharging chamber and a feeding-side inlet provided in the transporting chamber, wherein the spacer dispersed liquid is fed to the discharging chamber through the discharging-side inlet, and is fed to the transporting chamber through the feeding-side inlet, wherein the draining section comprises a discharging-side outlet provided in the discharging chamber and a feeding-side outlet provided in the transporting chamber, and wherein the spacer dispersed liquid is drained from each of the discharging chamber and the transporting chamber through the discharging-side outlet and the feeding-side outlet.

14. The head module according to claim 13, further comprises a circulating system, wherein the circulating system returns the spacer dispersed liquid drained to the draining section to the feeding section.

15. The head module according to claim 14, wherein the circulating system mixes the spacer dispersed liquid drained through the discharging-side outlet and the spacer dispersed liquid drained through the feeding-side outlet, and returns the mixture to the feeding section.

16. The head module according to claim 14, wherein the circulating system comprises a buffer chamber in which the spacer dispersed liquid is stored, wherein the spacer dispersed liquid stored in the buffer chamber is fed to the feeding section, and the spacer dispersed liquid drained through the draining section is returned to the buffer chamber.

17. A printing apparatus, comprising:

a storing system in which a spacer dispersed liquid is stored, and at least one head module to which the spacer dispersed liquid is fed from the storing system, wherein the at least one head module comprises a head body having a hollow interior;

a nozzle plate including one wall surface of the head body;

at least one ejection hole provided in the nozzle plate;

a feeding section for feeding the spacer dispersed liquid in the interior of the head body; and a draining section for draining the spacer dispersed liquid from the interior of the head body, wherein the spacer dispersed liquid fed from the feeding section is discharged through the at least one ejection hole, wherein an inner space of the head body is divided into a discharging chamber on a side of the nozzle plate and a transporting chamber on a side opposite to the nozzle plate by an internal filter through which the spacer dispersed liquid can pass, wherein the feeding section comprises a discharging-side inlet provided in the discharging chamber and a feeding-side inlet provided in the transporting chamber, wherein the spacer dispersed liquid is fed to the discharging chamber through the discharging-side inlet and is fed to the transporting chamber through the feeding-side inlet, wherein the draining section comprises a discharging-side outlet provided in the discharging chamber and a feeding-side outlet provided in the transporting chamber, and wherein the spacer dispersed liquid is drained from each of the discharging chamber and the transporting chamber through the discharging-side outlet and the feeding-side outlet.

18. The printing apparatus according to claim 17, further comprising a circulating system for returning the spacer dispersed liquid drained to the draining section to the feeding section, wherein the spacer dispersed liquid is fed from the storing system to the circulating system.

* * * * *